(12) United States Patent
Eccles et al.

(10) Patent No.: US 7,937,949 B2
(45) Date of Patent: May 10, 2011

(54) EMERGENCY POWER ENGINE RESTART SYSTEM

(75) Inventors: Steven R. Eccles, Torrance, CA (US); Mike S. Koerner, Rancho Palos Verdes, CA (US); Filip A. Reinis, Long Beach, CA (US)

(73) Assignee: Honeywell International, Inc., Morristown, NJ (US)

( * ) Notice: Subject to any disclaimer, the term of this patent is extended or adjusted under 35 U.S.C. 154(b) by 980 days.

(21) Appl. No.: 11/772,675

(22) Filed: Jul. 2, 2007

(65) Prior Publication Data

US 2009/0007568 A1     Jan. 8, 2009

(51) Int. Cl.
*F02C 7/26* (2006.01)

(52) U.S. Cl. ............................................. 60/786; 60/802

(58) Field of Classification Search .................. 60/786, 60/787, 788, 802; 74/6, 7 C
See application file for complete search history.

(56) References Cited

U.S. PATENT DOCUMENTS

| | | | |
|---|---|---|---|
| 3,171,252 A * | 3/1965 | Trowbridge et al. | 60/788 |
| 3,290,963 A * | 12/1966 | Oldfield et al. | 74/665 M |
| 3,714,779 A * | 2/1973 | Stein et al | 60/796 |
| 3,722,214 A | 3/1973 | Guillot | |
| 3,951,008 A * | 4/1976 | Schneider et al. | 74/661 |
| 3,965,673 A * | 6/1976 | Friedrich | 60/788 |
| 4,177,693 A | 12/1979 | Ivanko et al. | |
| 4,257,281 A | 3/1981 | Bunger | |
| 4,829,850 A | 5/1989 | Soloy | |
| 4,871,296 A | 10/1989 | Laessle et al. | |
| 5,003,767 A | 4/1991 | Rodgers | |
| 5,042,963 A | 8/1991 | Sorenson et al. | |
| 5,108,043 A | 4/1992 | Canavespe | |
| 5,174,109 A | 12/1992 | Lampe | |
| 5,201,798 A | 4/1993 | Hogan | |
| 5,309,708 A * | 5/1994 | Stewart et al. | 60/787 |
| 5,319,989 A | 6/1994 | Burch | |
| 5,435,125 A | 7/1995 | Telakowski | |
| 6,059,085 A | 5/2000 | Farnsworth | |
| 6,732,529 B2 | 5/2004 | Anderson | |
| 7,186,081 B2 | 3/2007 | Giesler et al. | |
| 7,805,947 B2 * | 10/2010 | Moulebhar | 60/787 |

* cited by examiner

*Primary Examiner* — Michael Cuff
*Assistant Examiner* — Phutthiwat Wongwian
(74) *Attorney, Agent, or Firm* — Oral Caglar, Esq.

(57) ABSTRACT

An engine starting apparatus and method may allow for two methods of engine start where only one engine gearbox accessory pad exists off the aircraft engine. A gearbox lubricating apparatus may also be provided to lubricate the gearbox at altitude without added complexity. Two engine starting inputs (for example, one input for ground start and one input for in-flight engine start) are provided while avoiding complex gearbox designs. Clutches may also be used to prevent the starter gearbox from continuous operation (rotation) after the engine has started. Apparatus and methods are also provided for improving the air-fuel combustion of the hot-gas turbine start input (for in-flight engine start) to minimize the build-up of solid carbon (soot) in and around the combustor and turbine nozzle flow passages.

14 Claims, 6 Drawing Sheets

EMERGENCY POWER ENGINE RESTART SYSTEM

BACKGROUND OF THE INVENTION

The present invention generally relates to engine restart systems and methods and, more specifically, to an emergency power engine restart system and method having separate hot and cold gas turbine wheels and an interconnecting gearbox.

In an aircraft gas turbine engine, an electric starter motor may be used to apply torque to the engine's shaft in order to start the engine. Alternatively, gas turbine engines may be started on the ground by providing a stream of pressurized air from a ground cart to an air turbine starter which can apply torque to the engine's shaft in order to start the engine. As the shaft starts to rotate, air is inducted into the compressor, compressed and then discharged into the combustor. Concurrently, the engine's fuel control system feeds fuel into the combustor in accordance with a pre-programmed fuel schedule in order to precisely maintain the proper fuel/air ratio in the combustor, thereby achieving a light-off condition. After light-off, the starter torque is augmented by torque from the engine's turbine. Before reaching idling speed of the engine, the starter is shut off. This operation constitutes a starting cycle of a gas turbine engine.

Typically, propulsion engines on aircraft will have an accessory gearbox either mounted to the engine or mounted to the airframe. Either way, this gearbox is connected to the shaft of the turbine engine. Typically, there are several "pads" located on this gearbox where several accessory components can attach and be driven by the gear and shafts within the gearbox. The accessories can be pumps, generators, and the like. For example, U.S. Pat. No. 4,372,517 discloses engine accessory pads for mounting a gearbox onto the shaft of a turbine engine.

Engine starters may also be connected to the main engine shaft via accessory gearboxes. U.S. Pat. No. 3,951,008 describes a gearbox used to start a turbine engine. The gearbox may include two inputs and one overrunning clutch. The two inputs are used in sequence to perform the starting process. One starter input is used to drive from zero rpm up to a particular speed, through the clutch. Then, the second starter input acts to slip the overrunning clutch and bring the turbine up to full starting speed. Both inputs are required to bring the engine up to starting speed.

U.S. Pat. No. 5,201,798 describes an assembly which combines the function of both an auxiliary power unit (APU) and an emergency power unit (EPU) into one unit. The unit also includes the primary APU turbine engine. The gearbox utilized in the '798 patent has several output shaft pads to drive pumps and an electrical generator. The '798 patent describes the use of an air turbine starter mounted onto the gearbox via a clutch to permit disengagement once the engine is started. There is also a hot-gas impulse turbine attached to the gearbox via another clutch, which allows for EPU restarts during flight. The '798 system is a single integrated system which may require complex disassembly and maintenance procedures for system servicing.

As can be seen, there is a need for a simple engine restart system which may be attached to the primary engine accessory gearbox via a single drive shaft pad. Moreover, there is a need for an engine restart apparatus and method providing dual turbine inputs for ground starting and in-flight engine restart capability.

SUMMARY OF THE INVENTION

In one aspect of the present invention, a starting apparatus for an engine comprises a ground-based engine starting system connected to turn an engine shaft; and a gearbox connected to an accessory pad of the engine, the gearbox connected to turn the engine shaft.

In another aspect of the present invention, a starting apparatus for an engine comprises an air turbine starter connected to turn an engine shaft; a gearbox connected to an accessory pad of the engine, the gearbox connected to turn the engine shaft; a hot gas turbine driving the gearbox, the hot gas turbine including a combustor for burning fuel and air to give a hot gas exhaust to drive the hot gas turbine; and a pitot pump lubrication system comprising an oil trough containing oil, the oil being turned by a gear in the gearbox to generate a circular velocity of the oil, and an open-ended tube receiving the oil and delivering the oil to locations in the gearbox requiring lubrication.

In a further aspect of the present invention, a method for in-flight engine start using an engine start system comprises burning fuel and air in a combustor to drive a turbine; turning a starter gear via the rotation of the turbine, wherein the starter gear is mounted on an accessory pad of the engine; disconnecting a ground-based engine starter with an over-running clutch; and driving an engine shaft through the rotation of the starter gear to affect engine start or restart.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an engine starting apparatus and method having two methods of engine start where only one engine gearbox accessory pad exists off the aircraft engine. The present invention may provide a gearbox lubricating apparatus and method that may lubricate the starter gearbox at altitude without added complexity. The present invention may provide two starting inputs (for example, one input for ground start and one input for in-flight engine start) while avoiding complex engine accessory gearbox designs. The present invention may also provide an apparatus and method for preventing the starter gearbox from continuous operation (rotation) after the engine has started. Finally, the present invention may provide apparatus and methods for improving the air-fuel combustion of the hot-gas turbine start input (for in-flight engine start, as described in more detail below) to minimize the build-up of solid carbon (soot) in and around the combustor and turbine nozzle flow passages.

Unlike conventional engine start systems which may provide for only one engine starting input, the present invention may provide for an accessory pad mounted gearbox with dual turbine inputs for engine starting. Also unlike conventional engine start systems, which may be integrated to the engine, the engine start system of the present invention may provide an engine starting system that attaches to the primary engine accessory gearbox via a single drive shaft pad. The engine start system of the present invention may be useful for engine start both on the ground and in-flight. The engine start system of the present invention may be useful for starting gas turbine engines, such as those found on commercial and military aircraft.

Figure 1:
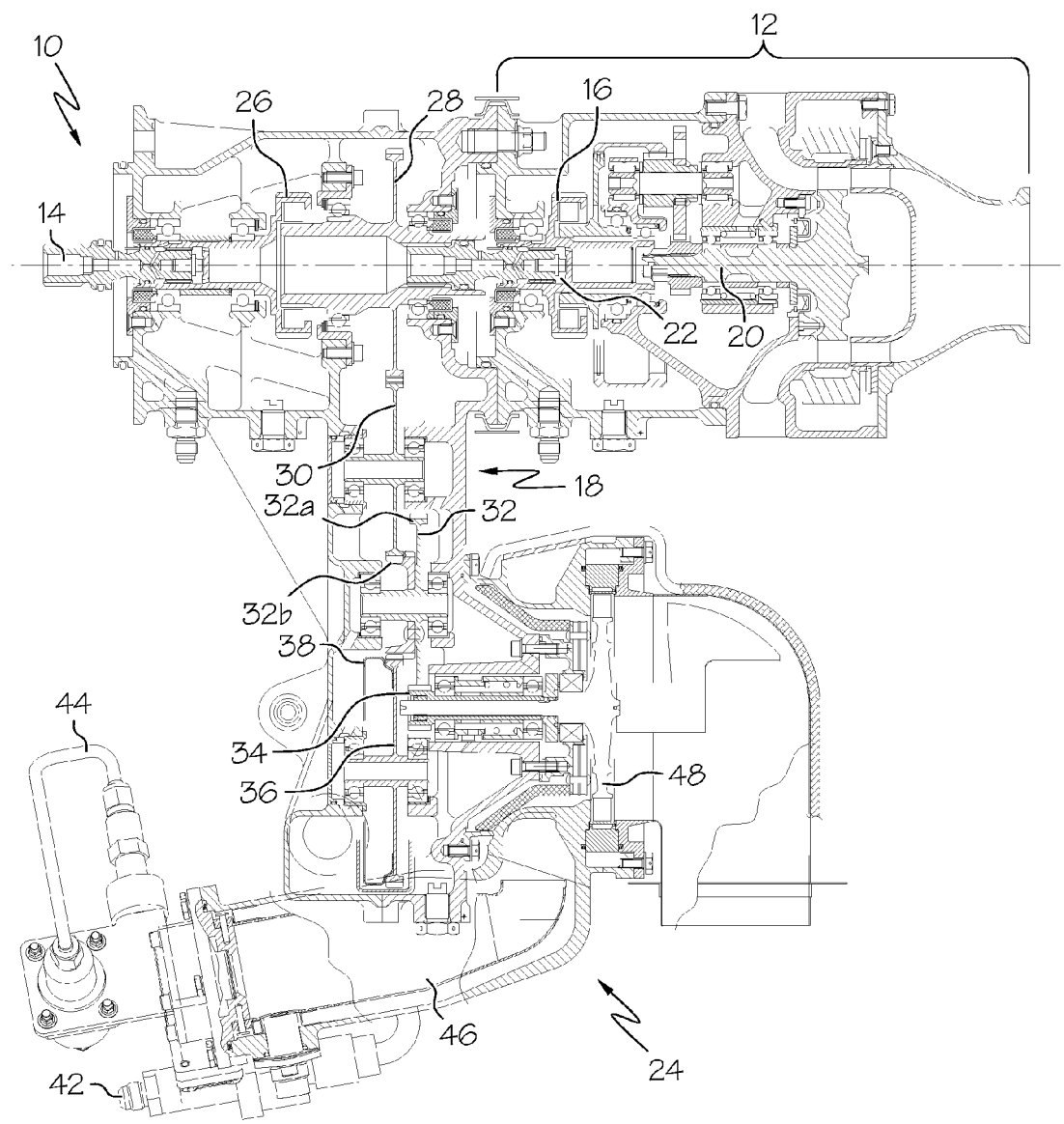
FIG. 1 is a cross-sectional view of an emergency power engine restart system according to the present invention.

Referring to FIG. 1, there is shown a cross-sectional view of an emergency power engine restart system 10 according to the present invention. The engine restart system 10 may include a ground-based engine starting system, such as a conventional air turbine starter 12. Air turbine starter 12 may be any typical air turbine starter used to turn a shaft 14 to start an engine (not shown). As shown in more detail in FIG. 4, the air turbine starter 12 may include an air turbine starter clutch 16 to prevent the engine from driving the air turbine starter 12 after the engine is started. The air turbine starter clutch 16 may be, for example, an over-running clutch. The over-running clutch 16 may allow a drive shaft 20, in this case, the shaft driven by the air turbine starter 12 to turn a driven shaft 22 (in this case, ultimately tied to the engine's shaft via the engine restart system output spline shaft 14). The over-running clutch 16, however, may disconnect the drive shaft 20 and the driven shaft 22 if a torque is applied to the driven shaft 22, such as when, for example, the engine is started.

The engine restart system 10 may include an accessory pad mounted gearbox 18. The gearbox 18 may be mounted onto an accessory pad (not shown) of the engine in any conventional manner, for example, in a manner similar to that of how typical accessories, such as pumps, generators, starters and the like may be mounted. The gearbox 18 may be driven by a hot gas turbine 24, as described in more detail below, to drive the engine's shaft via the engine restart system output spline shaft 14 to affect engine start. In one embodiment of the invention, the air turbine starter 12 may be used to start the engine on the ground and the hot gas turbine 24 may be used for in-flight engine restart.

The engine restart system 10 may include an accessory pad clutch 26. The accessory pad clutch 26 may be an over-running clutch, similar to the air turbine starter clutch 16. The accessory pad clutch 26 may prevent the engine from driving the gearbox 18 after the engine has been started or restarted.

Figure 2:
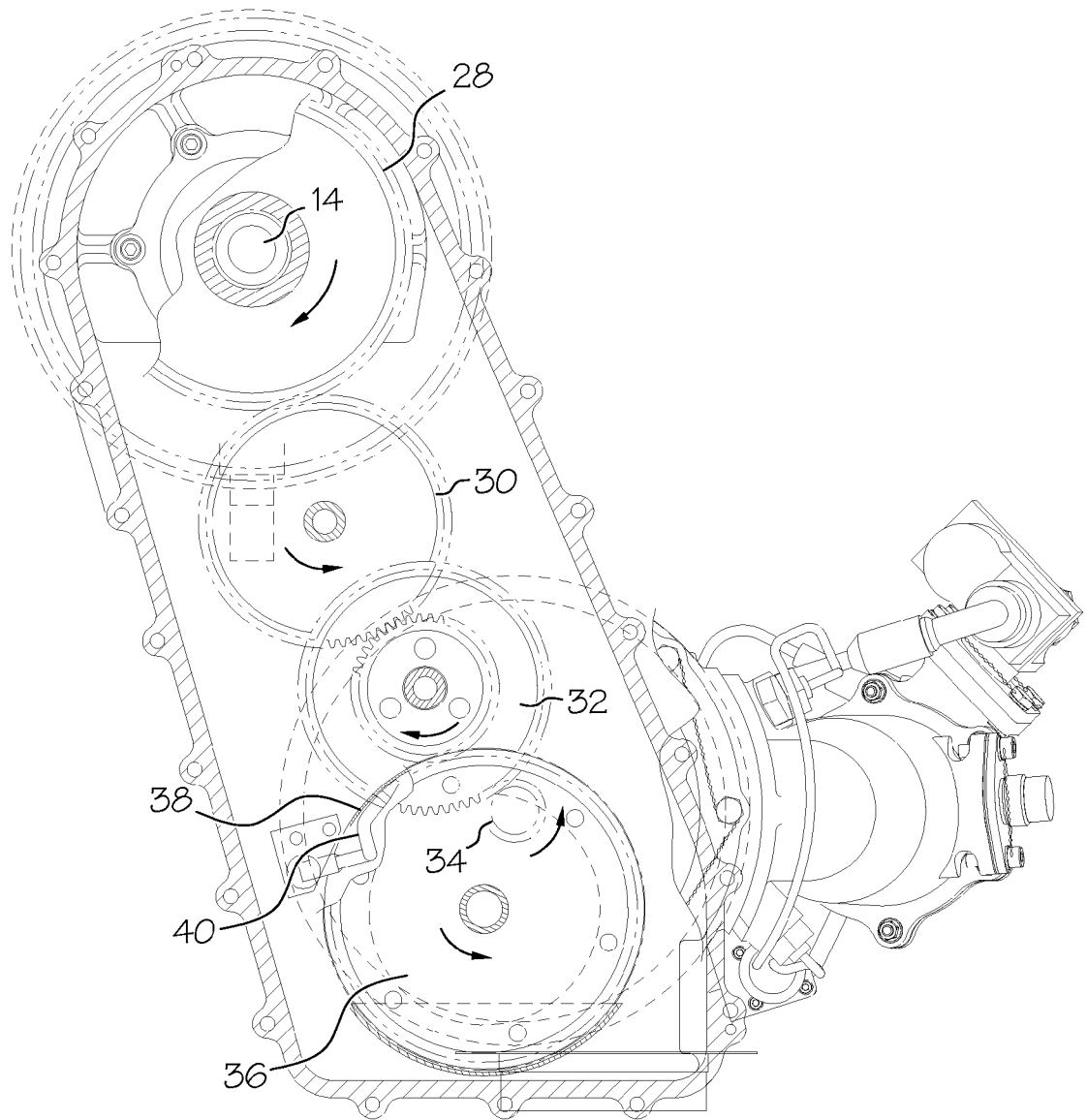
FIG. 2 is a partially cut-away end view of the emergency power engine restart system of FIG. 1.
Figure 3:
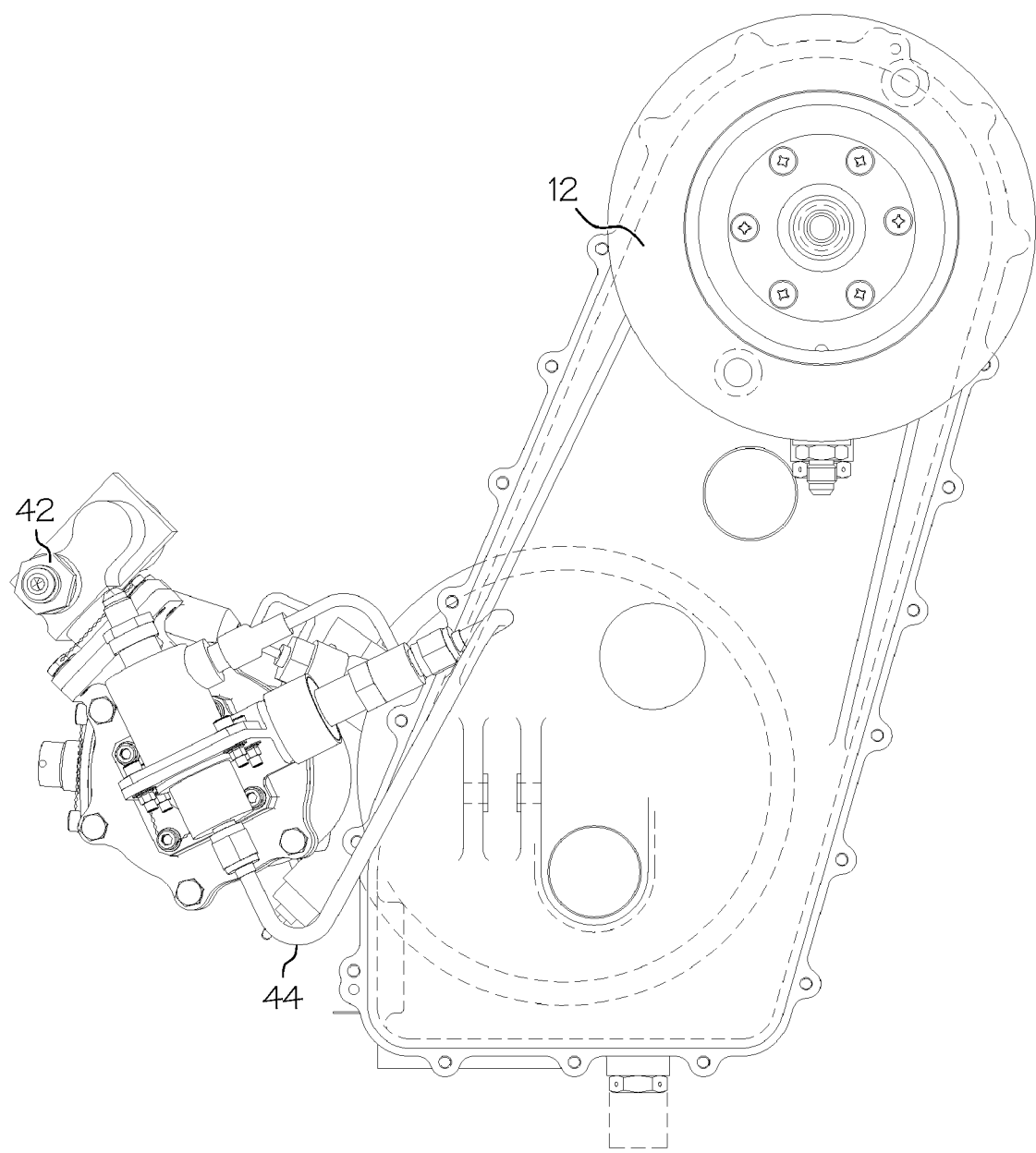
FIG. 3 is an end view of the emergency power engine restart system of FIG. 1.

Referring now to FIGS. 2 and 3, along with FIG. 1, the gearbox 18 may include a plurality of gears, typically spur gears, such as a starter gear 28, an idler gear 30, a compound gear 32, a turbine pinion gear 34 and a pitot pump gear 36. The hot gas turbine 24 may drive the turbine pinion gear 34. The turbine pinion gear may be designed, via, for example, spur gears, to drive the compound gear 32. The compound gear may have two separate spur gears, a first spur gear 32a which may be used to receive the rotational torque from the turbine pinion gear 34 and a second spur gear 32b which may be used to drive both the pitot pump gear 36 and the idler gear 30. Finally, the idler gear 30 may be used to turn the starter gear 28, which, in turn, drives the engine's shaft via the engine restart system output spline shaft 14 to start or restart the engine.

The pitot pump gear 36 may be used to drive a pitot pump lubrication system. The pitot pump lubrication system, as it typically known in the art may include an open-ended tube 40 located in an oil trough 38. One of the gears, in this case, the pitot pump gear 36, may put the oil inside the oil trough 38 into circular motion. The open ended tube 40 may be installed into the circular flow of oil in the oil trough 38 to harness the kinetic energy of this circular flow. This kinetic energy is used to deliver the oil, through the open ended tube 40, to locations where lubrication may be needed. Pitot pump lubrication systems may be useful, especially in the engine restart system 10 of the present invention, because they may be reliable, relatively inexpensive (compared to other conventional lubrication systems) and relatively insensitive to variations in altitude, attitude and oil quantity.

The hot gas turbine 24 may include an air inlet 42 and a fuel delivery channel 44 for delivering air and fuel in to a combustor 46. Hot combustion gases may be used to drive a turbine wheel 48, which, in turn, drives the hot gas turbine pinion gear 34. The hot gas turbine 24 may use a fuel rich jet-fuel and air combustor 46 which only partially reacts the propellants to avoid the formation of solid carbon (soot). A more complete reaction may clog the combustor and turbine nozzle flow passages (not shown).

The incomplete or "non-equilibrium" reaction may leave the carbon in the combustion products bonded to oxygen as carbon monoxide or carbon dioxide gas or bonded to hydrogen in relatively low-molecular-weight hydrocarbon molecules such as methane ($CH_4$), ethane ($C_2H_6$), propane ($C_3H_8$), butane ($C_4H_{10}$), pentane ($C_5H_{12}$), hexane ($C_6H_{14}$), heptane ($C_7H_{16}$) and octane ($C_8H_{18}$). In essence, the hydrocarbon molecules that make up the fuel are broken down into smaller hydrocarbon molecules rather than being more completely oxidized into products which include free carbon. The incomplete reaction may be achieved by some combination of a) restricting the residence time of the reactants in the combustion chamber; b) restricting the combustion chamber temperature; and c) maximizing the size of the droplets of fuel injected into the chamber.

Restricting the residence time of the reactants in the combustor may be achieved by restricting the characteristic length (also referred to as "L-star" and written as "L*") of the combustion chamber. Characteristic length is the volume of the chamber divided by its exit area. A combustion chamber characteristic length of less than about 485 inches may provide relatively clean and soot-free reaction products.

Restricting the combustion chamber temperature may limit the rate of the oxidation reaction. This can be achieved by limiting the air-to-fuel (A/F) ratio of the reactants. A/F ratios below about 3.5:1 (about 1800° F. combustion chamber temperature) have been found to result in relatively clean and soot-free reaction products.

Maximizing the size of the fuel droplets may also decrease the rate of reaction in that the larger droplets have a lower surface area to volume ratio, and thus vaporize more slowly. Fuel sprays with a Sauter Mean Diameter (SMD) of 20 microns or more may burn relatively clean and soot-free.

Figure 4:
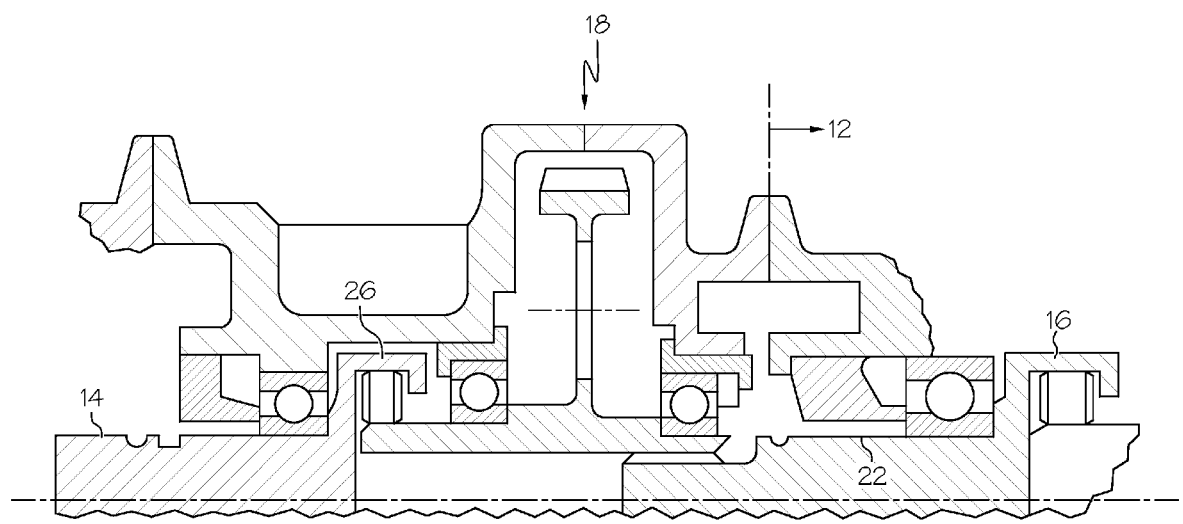
FIG. 4 is a close-up view showing one clutch configuration for the emergency power engine restart system according to the present invention.

Referring now to FIG. 4, along with FIG. 1, there is shown a close-up view of one clutch configuration for the emergency power engine restart system 10 according to the present invention. In this configuration, which is similar to that shown in FIG. 1, the air turbine starter clutch 16 may disconnect the air starter turbine 12 when the engine is operating or when the hot gas turbine 24 is operating to restart the engine. In other words, if a torque is applied to the driven shaft 22, the air turbine starter clutch 16 may prevent the drive gear 20 from turning. Similarly, the accessory pad clutch 26 may prevent the started engine from driving the gearbox 18 but may allow the gearbox 18 to turn the engine's shaft 14 to affect start or restart of the engine. In this embodiment, the air starter turbine 12 may drive the gearbox 18.

Figure 5:
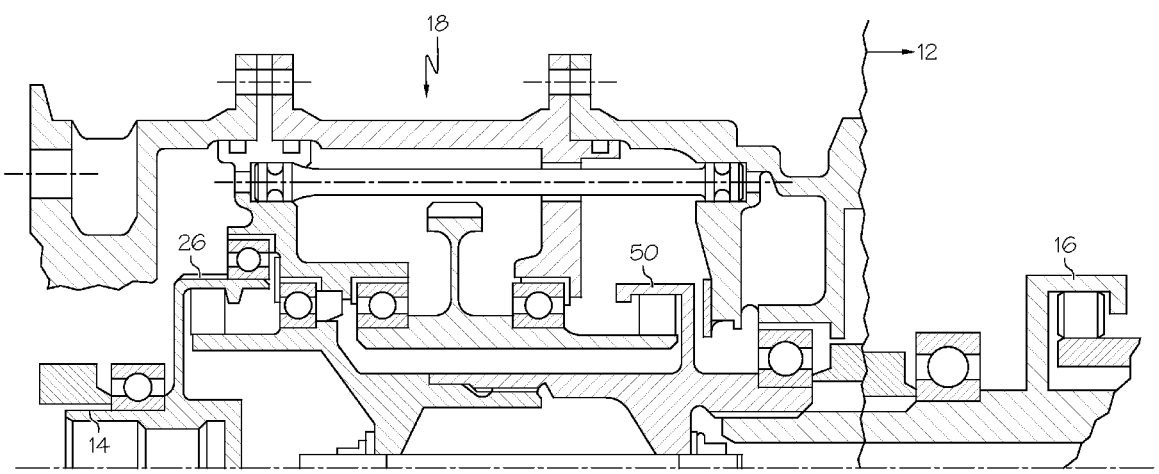
FIG. 5 is a close-up view showing another clutch configuration for the emergency power engine restart system according to the present invention.

Referring to FIG. 5, along with FIG. 1, there is shown a close-up view of another clutch configuration for the emergency power engine restart system 10 according to the present invention. In this embodiment, a secondary clutch 50 may be used to prevent the air turbine starter 12 from back-driving the gearbox 18 (and, in turn, the hot gas turbine 24) but allows the air turbine starter 12 to turn the engine's shaft 14 to affect engine start. In this embodiment, the accessory pad clutch 26 and the air starter turbine clutch 16 may also be employed as described above with reference to FIGS. 1 and 4.

Figure 6:
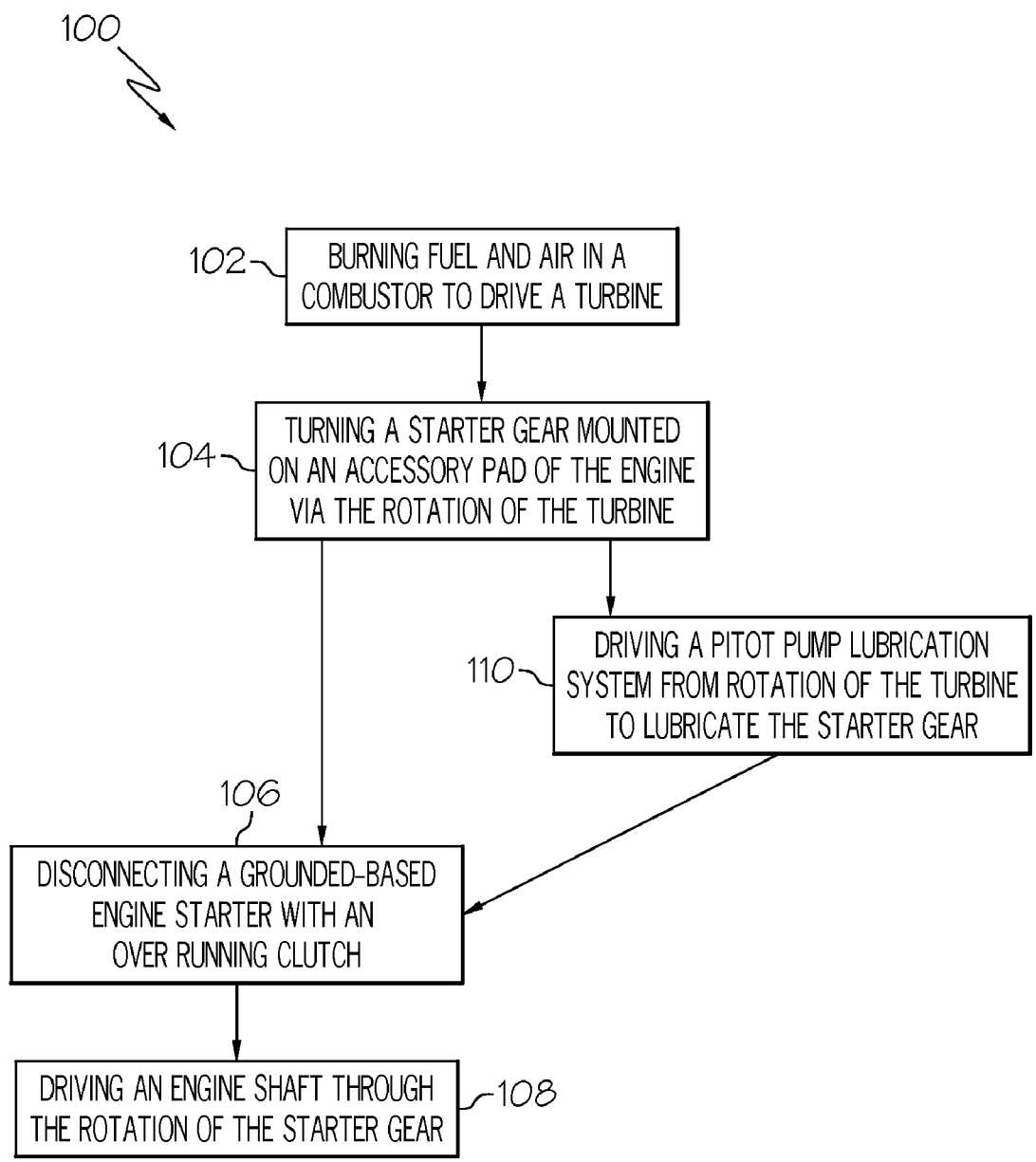
FIG. 6 is a flow chart describing a method for emergency power engine restart according to the present invention.

Referring to FIG. 6, there is shown a flow chart describing a method for in-flight engine start using an engine start system 10 according to the present invention. The method 100 may include a first step 102 of burning fuel and air in a combustor to drive a turbine. A second step 104 may include turning a starter gear via the rotation of the turbine, wherein the starter gear is mounted on an accessory pad of the engine. A third step 106 may include disconnecting a ground-based engine starter (such as air turbine starter 12) with an over-running clutch. A fourth step 108 may include driving an engine's shaft through the rotation of the starter gear to affect engine start or restart. An optional step 110 may include driving a pitot pump lubrication system from the turbine's rotation in order to lubricate the gears of the engine start system 10. The first step 102 may be carried out, in one embodiment of the present invention, by techniques described above to affect the incomplete burning of the fuel, thereby minimizing carbon deposits in the hot gas turbine.

It should be understood, of course, that the foregoing relates to exemplary embodiments of the invention and that modifications may be made without departing from the spirit and scope of the invention as set forth in the following claims.

We claim:

1. A starting apparatus for an engine comprising:
a gearbox including a starter gear, an idler gear, a compound gear, a turbine pinion gear and a pilot pump gear, the gearbox configured to be attached to an accessory pad of the engine, the gearbox selectively connectable to turn an engine shaft at the accessory pad;
a hot gas turbine attached to the gearbox and selectively connectable to drive the turbine pinion gear, the turbine pinion gear drives the compound gear to turn the engine shaft; and
an air turbine starter attached to the gearbox and selectively connectable to turn the engine shaft through the accessory pad.

2. The starting apparatus of claim 1, wherein the hot gas turbine has a combustor with a characteristic length of less than about 486 inches.

3. The starting apparatus of claim 2, wherein the air to fuel ratio is below about 3.5:1.

4. The starting apparatus of claim 2, wherein the fuel droplets have a Sauter Mean Diameter of about 20 microns or greater.

5. The starting apparatus of claim 1, further comprising a pitot pump lubrication system.

6. The starting apparatus of claim 5, wherein the pitot pump lubrication system includes:
an oil trough containing oil, the oil being turned by a gear in the gearbox to generate a circular velocity of the oil; and
an open-ended tube receiving the oil and delivering the oil to locations in the gearbox requiring lubrication.

7. The starting apparatus of claim 1, further comprising:
a first clutch for disconnecting the air turbine starter when torque is applied to the engine shaft by either the engine or by the gearbox; and
a second clutch for disconnecting the gearbox when torque is applied to the engine shaft by the engine.

8. The starting apparatus according to claim 1, further comprising a secondary clutch for disconnecting the gearbox when the air turbine starter is operating.

9. The starting apparatus according to claim 1, wherein:
the compound gear has two separate spur gears, a first spur gear which receives rotational torque from the turbine pinion gear, and a second spur gear which drives both the pilot pump gear and the idler gear; and
the idler gear turns the starter gear, which, in turn, drives the engine shaft.

10. The starting apparatus according to claim 9, wherein the starter gear, the idler gear, the compound gear, the turbine pinion gear and the pitot pump gear are spur gears.

11. A starting apparatus for an engine comprising:
an air turbine starter selectively connectable to turn an engine shaft;
a gearbox attached to an accessory pad of the engine, the gearbox connected to turn the engine shaft only if the air turbine starter is disconnected from the engine shaft;
a hot gas turbine configured to drive the gearbox to turn the engine shaft, the hot gas turbine including a combustor for burning fuel and air to give a hot gas exhaust to drive the hot gas turbine; and
a pitot pump lubrication system comprising an oil trough containing oil, the oil being turned by a gear in the gearbox to generate a circular velocity of the oil, and an open-ended tube receiving the oil and delivering the oil to locations in the gearbox requiring lubrication.

12. The starting apparatus according to claim 11, further comprising:
a first clutch for disconnecting the ground-based engine starting system when torque is applied to the engine shaft by either the engine or by the gearbox;
a second clutch for disconnecting the gearbox when torque is applied to the engine shaft by the engine; and
a secondary clutch for disconnecting the gearbox when the ground-based engine starting system is operating.

13. The starting apparatus according to claim 11, wherein the fuel is incompletely burned in the combustor.

14. The starting apparatus according to claim 13, wherein the fuel is incompletely burned by at least one of the following techniques:
the combustor has a characteristic length of less than about 486 inches;
the air to fuel ratio is below about 3.5:1; and
the fuel has a Sauter Mean Diameter of about 20 microns or greater.

* * * * *